Feb. 19, 1957  J. R. ALMOND  2,782,028
DOOR OPERATING SYSTEM
Filed May 5, 1951  7 Sheets-Sheet 1

INVENTOR.
JOHN R. ALMOND
BY
Richey Watts
ATTORNEYS

Feb. 19, 1957  J. R. ALMOND  2,782,028
DOOR OPERATING SYSTEM
Filed May 5, 1951

INVENTOR.
JOHN R. ALMOND
BY
*Richey Watts*
ATTORNEYS

Feb. 19, 1957 J. R. ALMOND 2,782,028
DOOR OPERATING SYSTEM
Filed May 5, 1951 7 Sheets-Sheet 4

INVENTOR.
JOHN R. ALMOND
BY
Richey & Watts
ATTORNEYS

Feb. 19, 1957

J. R. ALMOND 2,782,028

DOOR OPERATING SYSTEM

Filed May 5, 1951

INVENTOR.
JOHN R. ALMOND
BY
Richey & Watts
ATTORNEYS

United States Patent Office 2,782,028
Patented Feb. 19, 1957

2,782,028

DOOR OPERATING SYSTEM

John R. Almond, Detroit, Mich., assignor to The Midland Steel Products Company, Cleveland, Ohio, a corporation of Ohio Application May 5, 1951, Serial No. 224,738

17 Claims. (Cl. 268—20)

This invention relates to dual closure systems for passenger vehicles, and more particularly such systems as applied to passenger coaches, busses, and the like.

The operation of vehicles of the type referred to, particularly if such vehicles are operated as transit vehicles in urban areas, requires great skill on the part of the operator because he is faced with many distractions in addition to operating the vehicle and collecting the fares, and is usually expected to maintain a schedule. Such vehicles usually have both front and rear doors and systems have been developed to relieve, as much as possible, the necessity for the operator to give attention to the rear door except in cases of emergency. To attain these ends in normal operation, the rear doors are controlled by the front doors, the latter being under the direct control of the operator at all times.

This presents two basic considerations with regard to the operation of the rear doors. First, the rear doors should open when passengers are standing on one or more of the exit steps in preparation for leaving the vehicle, but such opening should be coincident with the opening of the front door, which latter door is under the direct observation of the operator and is therefore not opened unless the vehicle is at a standstill. Second, in view of the means for remote control of the rear door, it is imperative that safety precautions be taken to prevent injury to the passengers.

These precautions take several forms, but most important is the provision of what is known as sensitive edges on the doors, which include rubber boots that encase electrical contact means to cause the doors to automatically open, should they start to close upon the passenger. Also, when the front door is opened, the rear door should not close so long as passengers are on one or more of the steps and, finally, so long as the rear door is open it is desirable to provide means whereby the vehicle may not be set into motion until the rear door is closed.

I am aware that prior systems have been in use to provide some of the above-named features, but to the best of my knowledge such systems have been complicated, expensive, and somewhat troublesome in that in addition to the necessary control switches, valves, and air pistons, numerous electrical relays have been incorporated in the system. These relays are expensive, the wiring of them is complicated and subject to trouble, and the contacts and other parts require regular cleaning and other maintenance to insure continuous operation.

A principal object of the invention resides in simplifying and rendering more economical installations of the type referred to as well as rendering them more foolproof. I have found that electrical relays or contactors can be entirely eliminated by providing a system made in accordance with my invention. The basic elements of my invention comprise the door motors, control switches or valves, door-position-controlled mechanical switches, various safety accessories such as sensitive edges and the like, and a master control unit for one or both of the door motors comprising a four-way reversing valve actuated by a pair of electrically-opposed electric solenoids. As will be seen from the detailed description of the invention which follows, a system provided in accordance with my invention requires no relays with their troublesome contacts, and therefore makes possible a reduction in complexity and cost of the installation, as well as an increase in its dependability and safety.

Experience in the field indicates that various municipalities and traction companies operating fleets of coaches or the like have different specifications as to just what safety devices and accessories are to be fitted to their vehicles. In prior systems this has required a multitude of individual relay circuits, the wiring of which presents somewhat of a problem and which mitigates against standardization. Although standardization can never be entirely attained under these conditions, an important object of the invention is in reducing the variable factors in the basic design of the system so that basic components thereof are readily adapted with little change or addition to accommodate the varied specifications encountered.

As will be apparent from the detailed description which follows, the universal nature or adaptability of the master control unit in association with the mechanical door-position-control switches makes it a simple matter to comply with the specifications usually encountered without adding any extra relays or switches, and particularly without materially affecting the basic system and its wiring. It has been found in the field that there are two basic systems specified for operating the doors, namely what may be termed a pneumatic system wherein the operator controls valves that direct fluid under pressure to the door motors and the electro-pneumatic system wherein the operator controls switches that, in turn, control valves for the fluid motors. Another object of the invention is to accommodate either system without requiring significant change in the component units.

The manner in which these and other objects that will be apparent to those skilled in the art to practice the invention will be readily ascertainable from the following detailed description of the preferred embodiment of the invention.

*Basic pneumatic system without accessories*

Figures 1, 1A:
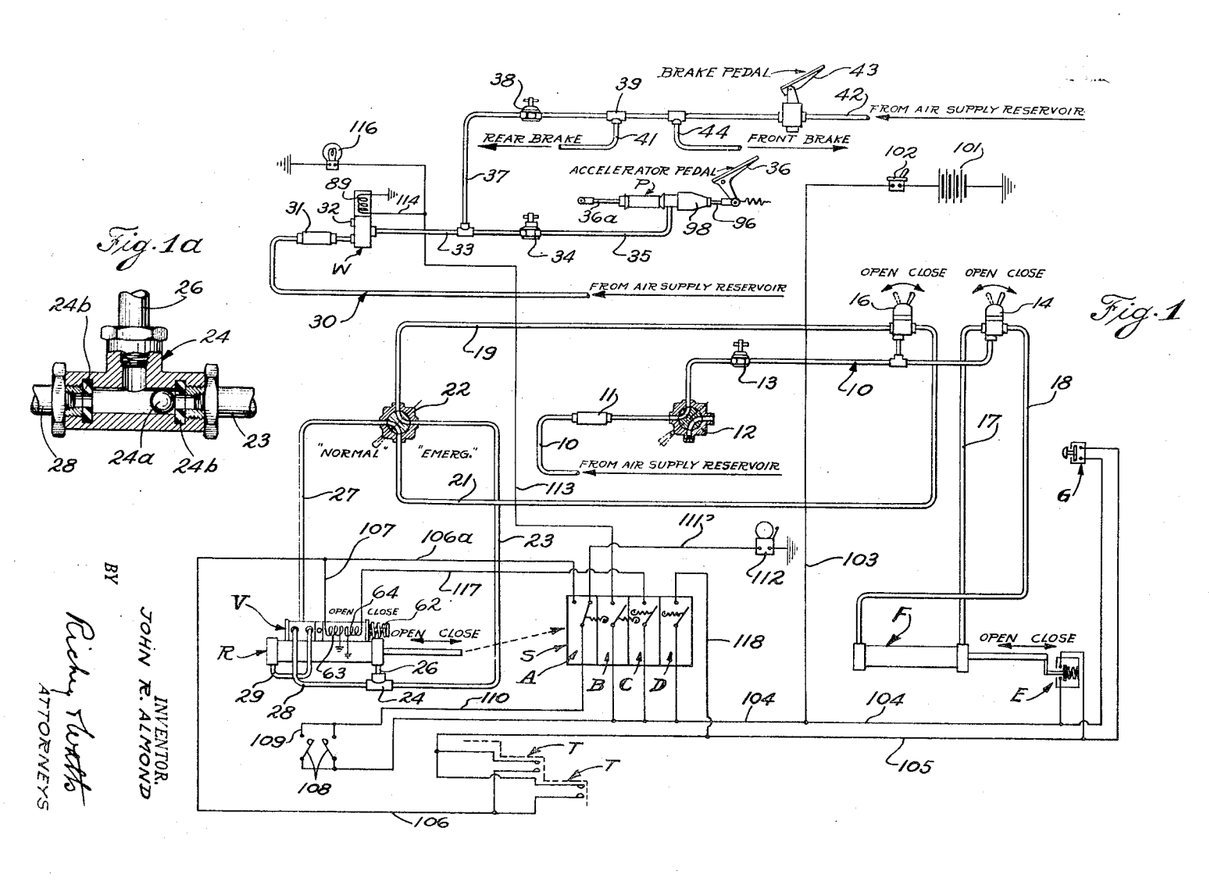
Fig. 1 is a schematic diagram of a pneumatic system embodying the invention.
Fig. 1a is a detail exemplifying the transfer check valve employed in the system.

Fig. 1 is a schematic diagram illustrating diagrammatically the elements in a pneumatic control system. The various elements of the system will first be briefly described, together with a brief mention of their function, whereupon those elements that require special description will be taken up in order, all of this to be followed by a résumé of the operation of the system.

As seen in Fig. 1 the basic elements for opening and closing the doors include a front-door-operating motor F in the form of a pneumatic piston and cylinder assembly, a rear-door motor R, and various air connections between the parts. Other auxiliary pneumatic elements appear on the drawing as well as electrical circuits, but these will be explained after the basic pneumatic door-control system has been described.

The air supply reservoir is connected by means of conduit 10 to a strainer 11, of any suitable construction, inserted in the conduit. Also, in the conduit is a three-way valve 12 for releasing pressure from the door system, if desired, and a pressure-regulating valve 13. Conduit 10 supplies air under pressure to a front-door control valve 14 and to a rear-door control valve 16, both valves being placed within reach of the operator.

If the operator wishes to open the front door, for example, he moves valve 14 to the open position and air is directed by means of conduit 17 to the cylinder F to actuate the door-opening mechanism. Air pressure remains in the cylinder so long as the door is open, and conversely to close the door the valve is moved so as to conduct air under pressure to the other end of the cylinder by means of conduit 18. Because of the safety features, the rear-door arrangement is somewhat more complicated. Conduits 19 and 21 lead from valve 16 and both go through an emergency valve 22 which is a four-way cock. With the valve 22 set for normal operation, if the valve 16 is moved to the open position, air under pressure passes through conduit 19 and is directed by valve 22 into conduit 23 leading to a transfer check valve 24 at the rear-door motor R. As seen in Fig. 1a, the transfer check valve includes a transfer check ball 24a and opposed seats therefor 24b. When air enters conduit 23, the ball is shifted so as to conduct air through conduit 26 and into the cylinder R to open the door.

To close the door, the valve 16 is moved by the operator to conduct air through conduit 21, through the emergency valve 22, and through conduit 27 which leads to a four-way valve in the control unit V. This valve is normally biased to the door-closed position so that air passes through conduit 29 from the valve to the other end of the cylinder to close the door. Conduit 28 leading from the valve unit V leads to transfer valve 24, in order to open the door, but line 28 is not utilized in the basic pneumatic operation now being described. Thus, it can be seen that with the basic system just described, the valve control unit V remains stationary and both front and rear doors are actuated by basic pneumatic operation.

The emergency valve 22 serves simply to shift the fluid under pressure in door-losing line 21 (which pressure is maintained in line 21 when the valve 16 is at the door-closed position) to the door-opening conduit 23. This valve is accessible to the passengers and reversal thereof in case of emergency causes the doors to open.

Brake and accelerator interlock air system

In addition to the basic door-opening and closing air system just described there is a brake and accelerator interlock system, illustrated diagrammatically in Fig. 1. The purpose of the system is to prevent the operator from starting the vehicle from rest when the rear door is open. Line 30 leading from the air supply reservoir and containing another strainer 31 is directed to a magnet valve W, which has one outlet 32 open to atmosphere and which has another outlet that connects to a conduit 33. Conduit 33 has two branches, one of which leads to the pressure regulator 34 from which conduit 35 leads to an accelerator-disabling mechanism P. This mechanism is connected at one end to the accelerator pedal 36 and has leading from the other end a rod 36a for connecting to the carburetor throttle linkage. The mechanism is so arranged, as will be described presently, that when air under pressure enters unit P, depression of the accelerator pedal 36 does not move the carburetor linkage.

The other branch of the air inlet line 33 is conduit 37 which leads to regulator 38 and to a transfer check valve 39 formed like transfer check valve 24. Conduit 41 leads from the transfer check valve to the air system for the rear brakes, the latter being applied when magnet valve W is opened. A conduit 42 from the air supply reservoir leads to the usual combined brake pedal and control valve unit 43, which likewise directs air to the transfer check valve 39 for the rear brake operation and to conduit 44 for front brake operation.

From this brief description of the basic elements of the accessory air system it can be seen that when the magnet valve W is opened by its control circuits air under pressure disables the accelerator, and by shifting the transfer valve 39 applies the rear brakes, thereby preventing starting of the vehicle.

The double-solenoid master valve V

Figure 2:
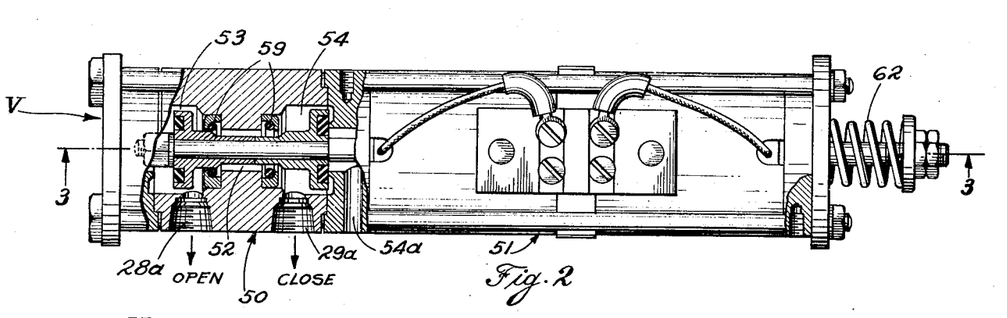
Figs. 2 and 3 show the master control unit, which is a four-way, double-solenoid-controlled valve.
Figure 3:
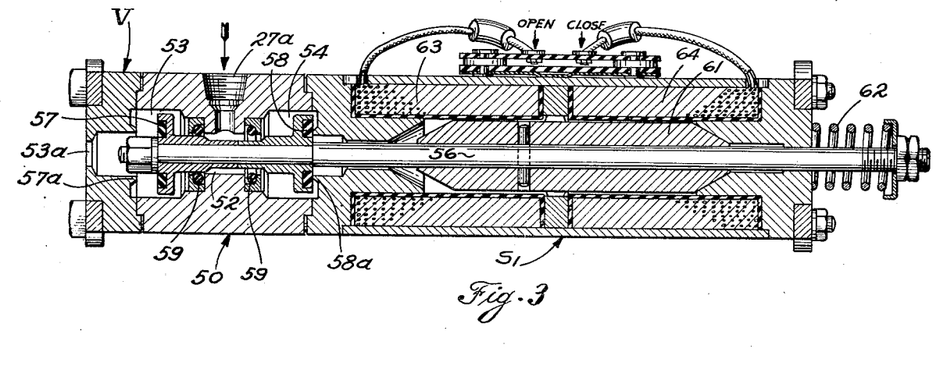

Having completed a description of the basic pneumatic units, certain elements of the system will now be described in more detail, before the detailed description of the operation is presented. Referring to Figs. 2 and 3, the double-solenoid valve unit V is shown. This valve is essentially like that disclosed in Patent No. 2,515,029.

The valve V comprises two major components, a four-way valve unit 50 and a double-solenoid actuator unit 51. Since this valve is described in detail in my aforesaid application, only the principal parts thereof will be referred to. The valve has three threaded ports for connection to lines in the system. Port 27a connects to line 27, and is the inlet port. Port 28a connects to line 28 and when utilized is the door-opening outlet. Port 29a connects to line 29 and is the door-closing outlet. Port 27a leads to a central chamber 52 which, in turn, communicates with spaced chambers 53 and 54, these chambers being open to ports 28a and 29a respectively, as best seen in Fig. 3. The chambers 53 and 54 in certain valve positions may also be vented to atmosphere by ports 53a (Fig. 3) and 54a (Fig. 2), respectively.

Central of the valve is a stem 56, which mounts opposed valve disc members 57 and 58 disposed in chambers 53 and 54 respectively. The chambers are also respectively formed with valve seats 57a and 58a to close off the atmosphere ports. O-ring sealing means 59 are likewise provided to engage the valve stems and act as seats engaged alternatively with the vent port seats.

When the valve is shifted to the left, from the position shown in Fig. 2, air entering inlet 27a goes past the left seal 59 into chamber 53 and out port 28a to open the rear door. The sealing of the right-hand ring 59 with the stem of valve 58 excludes air from the chamber 54, but the latter is vented by port 54a. If the valve is shifted to the right as shown in the figure, the reverse action takes place, the air under pressure is directed from port 29a in order to close the rear door.

The double-solenoid actuating section 51 contains an elongated dual-width armature 61 pinned to the stem 56, and in the system being described the whole assembly is biased to the right, or door-closed position by an external spring 62. Two solenoids 63 and 64 surround the armature and are so arranged relatively thereto that solenoid 64 tends to move the valve to the right in the drawings so as to close the door and solenoid 63 moves the valve to the left in the figures so as to open the door.

An important feature of this valve construction, as described in my aforesaid application, is that, disregarding any bias on the valve, only a momentary energization of either solenoid is required to cause the valve to remain in its shifted position so long as air under pressure is present at the inlet port 27a. This is because of the differential areas of the valve disc 57. For example, with the valve in the position shown in Fig. 2 and the associated O-ring sealed with the stem 56 of the valve disc 56, there is an unbalanced force on the valve 58 holding the valve to the right.

A feature of the solenoid arrangement which, in some installations, is of importance is the selectiveness of the solenoid. For example, assume that solenoid 64 is energized, shifting the valve to the right (as seen in Fig. 2). Due to the reduced air path for the magnetic lines of force from solenoid 64, as compared with the air path of the other solenoid, even though solenoid 63 is energized subsequently, so long as solenoid 64 remains energized the latter is dominant and control cannot be taken away therefrom by solenoid 63. Of course, the reverse action also occurs.

Rear-door motor arrangement

Figure 4:
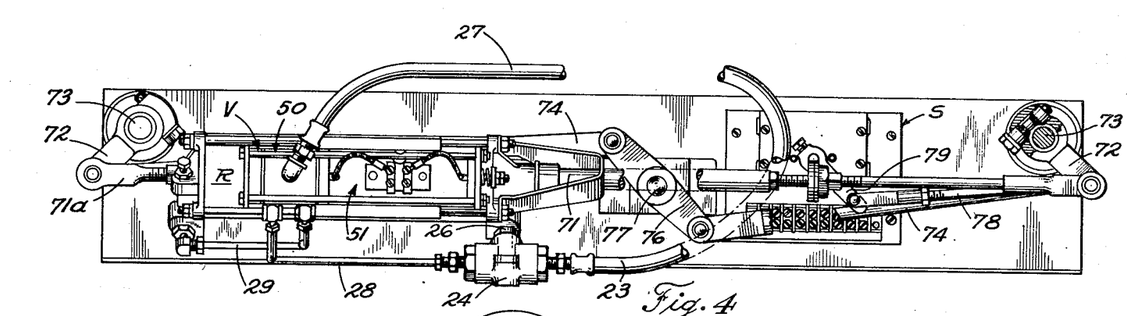
Figs. 4 and 5 are views of the rear-door motor arrangement.
Figure 5:
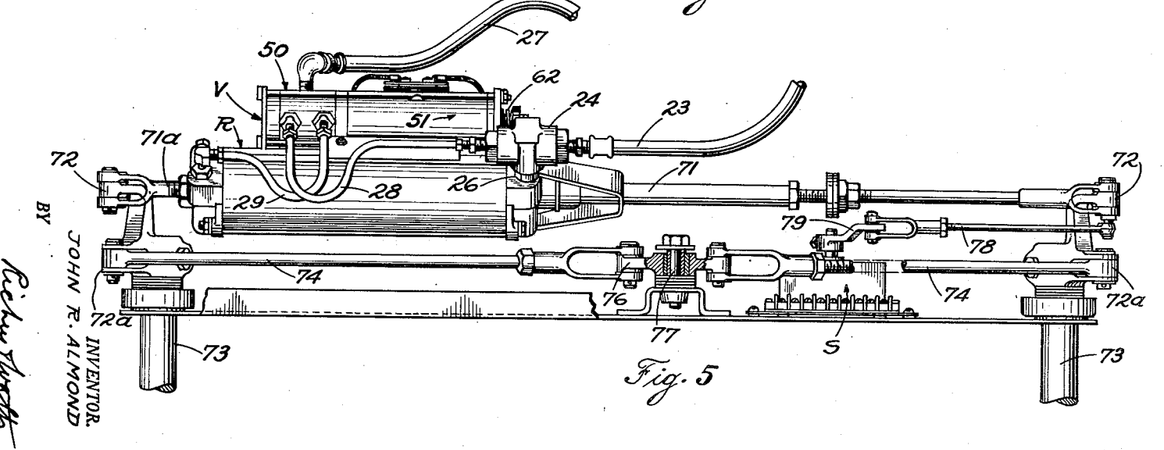

The design details of the rear-door motor operating arrangement form no part of the invention, but reference is made to Figs. 4 and 5 to illustrate how applicant's control unit V and the other elements may be arranged in typical installations. The solenoid valve unit V is mounted on the rear-door motor R which, in turn, is enclosed in the usual housing surrounding the entire assembly and disposed above the top of the doors. Motor R has a double-ended piston rod assembly. One piston rod 71 is connected to a crank 72 which is connected to the shaft 73 for operating one of the two double doors. The other piston rod 71a connects to a companion crank 72 and its associated door-operating shaft 73.

Aligned with each of cranks 72 is a synchronizing crank 72a, each synchronizing crank being connected to a cross link 74, the inner ends of which pivot to a short lever 76. Lever 76 is pivotally mounted as at 77 to the framework of the unit, this cross linkage serving to equalize the position of the two doors so that they both close and open simultaneously. Nothing is claimed concerning the linkage structure just described.

A door-position-controlled mechanical switch S is likewise mounted in this assembly, and the contacts therein are made or broken in response to door position by means of a link 78 pivoted at one end to the right-hand crank 72, and to an arm 79 at the other end, which arm serves to actuate the switch. Internal details of the switch will be explained presently.

Details of brake and accelerator interlock units

Figure 6:
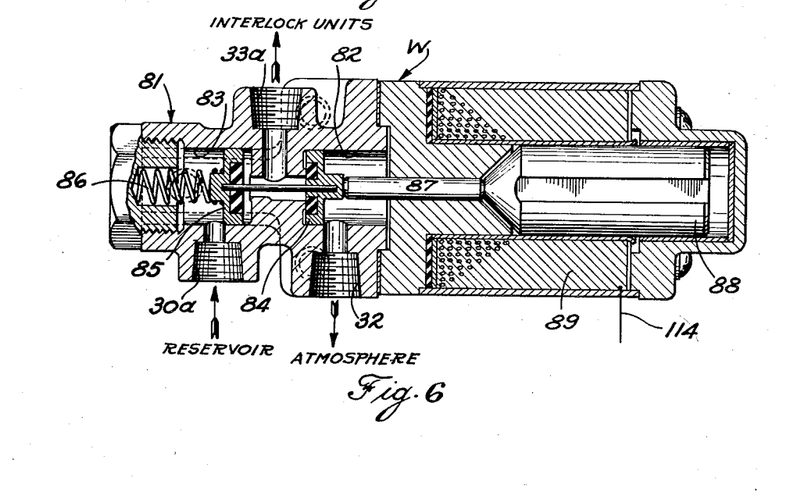
Fig. 6 shows the solenoid control valve for the brake and accelerator interlock system.

As explained previously, the brake and accelerator interlock units are controlled by a magnet valve W, the construction of which appears in Fig. 6. The valve has a valve body 81 having inlet port 30a, an outlet port 32 leading to atmosphere, and an outlet port 33a for connection to line 33 to actuate the interlock units. Formed within the body are right and left-hand interconnected chambers 82 and 83 respectively, which chambers are connected to ports 32 and 30a, respectively, and both of which may be connected to the outlet port 33a. A valve disc 84 is positioned in chamber 82 and is coupled to a second valve disc 85 disposed in chamber 83.

The valve assembly is urged to the right in the drawings by a compression spring 86, the right-hand position being that which vents the interlock units to atmosphere by means of port 32. The valve assembly is urged to the left (the position shown in the drawings) by a pin 87 held against the armature 88 of the solenoid 89 attached to the valve. When the solenoid is energized, air from the reservoir is directed to port 30a, out port 33a to the interlock units, to prevent starting of the bus as has been explained. Both valve members 84 and 85 are polygonal to prevent blocking of the air flow.

Figure 7:
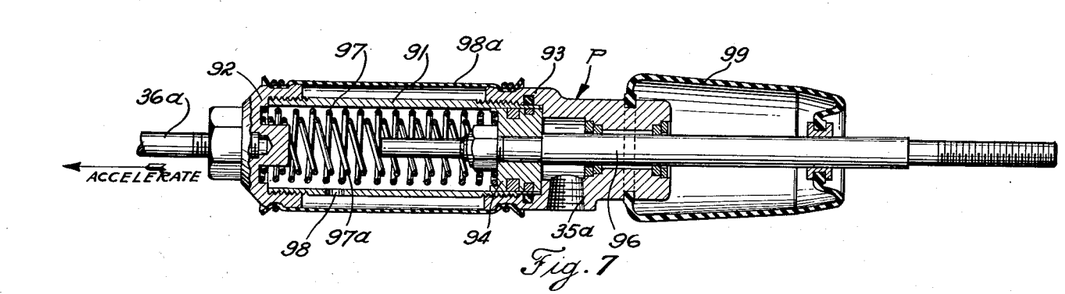
Fig. 7 shows one form of accelerator disabling mechanism.

Referring to Fig. 7, one form of accelerator-disabling mechanism which has been found to be practical and foolproof is disclosed. The mechanism has the characteristic that it does not provide a positive stop that might be broken by a heavy-footed operator exerting excessive pressure on the pedal. The mechanism P is nothing more than a spring-loaded piston and cylinder assembly. Omitting reference to unimportant details, the cylinder 91 has an end cap 92 and a cylinder head 93 attached thereto. Sliding in sealed relation with the cylinder is the piston 94 to which is attached a piston rod 96, the latter also serving as an actuating rod for connection to the accelerator pedal 36, as seen in Fig. 1.

The end cap 92 has extending therefrom a rod 36a which, in normal operation, serves as an extension of the accelerator pedal 36 and leads to the carburetor-actuating linkage. The piston is urged in its extended position by a pair of coil springs 97 and 97a disposed within the cylinder, and dirt is excluded from a breather port 98 by a suitable boot 98a, boot 99 also being provided to keep rod 96 clean. A port 35a leads to the chamber at the head of the piston, and the fluid under pressure entering such port tends to urge the cylinder assembly, and hence the rod 36a, to the right, and the piston to the left, from their position in the drawings.

This action is in such a direction as to tend to close the accelerator and to cause the accelerator pedal to be depressed. However, the regulator 34 is so adjusted with relation to the two springs that the fluid pressure balances the spring force so that when the accelerator is depressed the piston merely slides in the cylinder, any unbalanced spring force being insufficient to overcome the conventional spring (not shown) employed to close the throttle. Thus, the accelerator is disabled and whether or not the brake interlock is applied, the vehicle cannot be started by employing the foot accelerator pedal alone.

Schematic diagram of the electrical system

In the form of the invention being described, the electrical system is only employed in connection with the safety accessories, such as sensitive edges, step-treadle switches, accelerator and brake interlocks and the like. The system is connected to the vehicle battery 101 by a manual switch 102 which, by means of line 103, leads to a line 104 which may be termed the "hot line." Line 104 leads to one pole of three single-pole, single-throw switches, namely, normally-closed switch D in the switch box S, switch E controlled by the front-door motor and being normally closed, and switch G convenient to the operator and being normally open. The other contacts of these switches D, E, and G are all connected to line 105 so that the switches are in effect in parallel across line 104, the "hot line," and line 105.

In the system illustrated, line 105 energizes the step-treadle switches, there being two such treadles T shown in the drawings. These treadles, which serve to close contacts under the weight of a passenger, are well-known in the art and are therefore not described in detail. The other contacts of the treadles lead, by means of line 106, to a line 107, and hence to solenoid 63 of the control unit V. This solenoid, it will be recalled, tends to move the valve to the door-open position against the bias of spring 62, which normally holds the valve in the door-closed position. It can be seen from the circuit just described that if either of the treadle contacts T is closed by a passenger, then the closing of any one of the switches D, E, and G will complete the circuit to the solenoid 63 and cause the door to open. The conditions of the closing and opening of such contacts will be outlined in a detailed description of the operation of the device that follows.

The "hot line" 104 is also connected to one set of contacts 108 in the sensitive-edge assembly of the doors. The other sensitive-edge contacts 109 connect, by means of line 110, to a single-pole, double-throw switch A. This switch is normally biased to close the right contact (as seen in the figure) which is connected to line 111 leading to a grounded bell 112. It can be seen from the circuit just described that with the switch A in the position illustrated the circuit to the bell will be completed if the sensitive-edge contacts are closed. The purpose of this arrangement is twofold in that it gives warning of an outsider attempting to pry between the sensitive edges, and also serves as a warning in case a finger or the like is caught between the sensitive edges with the doors closed.

In addition to the line 106 leading from the treadles to the solenoid 63 to open the door, a companion line 106a leads to solenoid 63 from the other or left-hand contact of switch A. With this arrangement it can be seen that whenever switch A is thrown to the left in the drawings, the line 110 from the sensitive edges is shifted from the warning line 111 to the aforesaid line 106a, and, hence, to the door-opening solenoid. Should the sensitive-edge contacts be closed under these conditions the door will open.

In order to supply current to the magnet W for applying the brake and accelerator interlocks, switch B is provided. This is a normally-open switch, which when closed conducts current from the "hot line" 104 to line 113 which leads, by means of line 114, to a solenoid 89 of the magnet valve and also to a warning light 116 which signals to the operator that the rear door is open and interlocks applied. The action of the brake and accelerator interlocks has been explained, such action taking place when line 113 is energized.

Circuit means are provided for automatically closing the rear doors under safe conditions, that is, when there is no interference between the sensitive edges and when passengers are not disposed upon the treadles. To this end a normally-closed switch C is connected across the "hot line" 104 and a line 117 leading to the door-closing solenoid 64. With this circuit, the solenoid 64 will be energized to move the valve to the door-closed position, whenever switch C is closed.

Reference has been made to switches A, B, C, D, E, and G in order to trace their circuits. The operating conditions under which they are effective depends partially upon the operator, partially upon the passengers, and partially upon the setup in the switch box S which is, in turn, controlled by the position of the rear door. Before explaining these conditions, the internal arrangement of switch box S will be described.

The door-position-controlled switch

Figure 8:
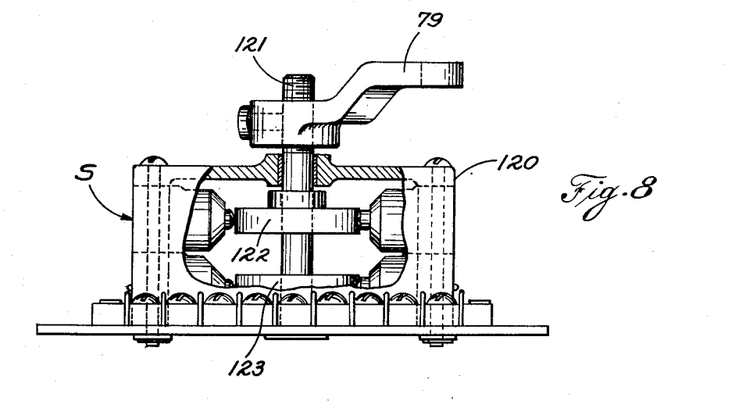
Fig. 8 shows the door-position-control mechanical switch.
Figure 9:
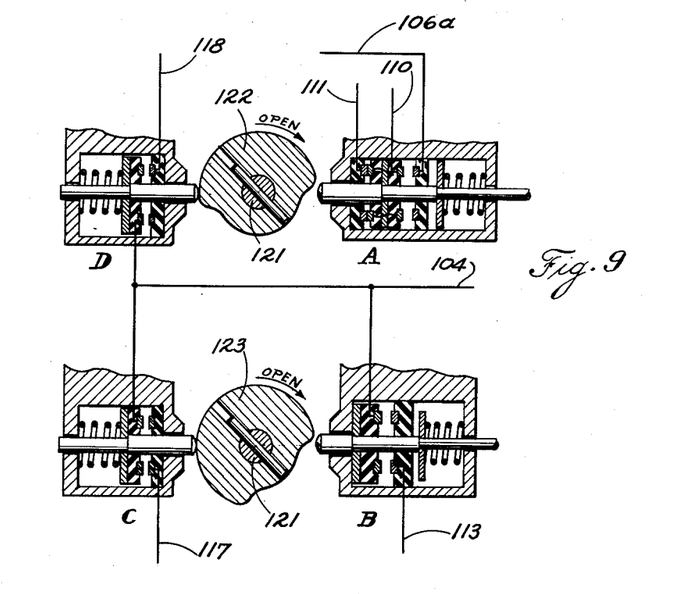
Fig. 9 is a schematic diagram of the switch.

Referring to Fig. 8, the switch includes a casing 120 that mounts an operating shaft 121. Fixed to this shaft are aligned cams 122 and 123 as well as the operating crank arm 79, previously mentioned. The upper cam 122 is arranged to actuate switches A and D, whereas the lower cam 123 is arranged to actuate switches B and C. Referring to Fig. 9, the cam timing and arrangement is disclosed. The switches herein are merely shown diagrammatically to illustrate visually whether or not they are double-pole, normally-closed, etc., it being understood that any suitable switches sold in the trade or known in the art may be employed.

The cams in Fig. 9 are shown in the position they occupy when the door is fully closed. Thus, referring to switch A, it can be seen that the normally-closed contacts connecting to line 111 are disposed to energize the bell 112. It can also be seen that as soon as the door starts to open, as indicated by the arrow, line 111 will be disconnected from the pole 110 and the latter will engage the contacts connected to line 106a, which, it will be recalled, is the line that connects the sensitive edges to the door-opening solenoid 63. Thus, the sensitive edges are energized after a very slight amount of opening motion of the door. Should an obstruction be in the door when it is closed, the cams are positioned as shown in Fig. 9, and switch A will complete the circuit to the signal bell 112.

Switch B is that which energizes the accelerator and brake interlocks. This switch is normally open, but when closed serves to connect the "hot line" 104 to line 113 leading to the magnet valve for the interlocks. It can be seen by the timing of the cam, as shown in Fig. 9, that this switch also is closed as soon as the rear door starts to open and remains closed until the rear door is closed.

Switch C sets up the door-closing circuit. As seen in Fig. 9, it is a normally-closed switch which is held open by the cam 123 until the doors are open. When the doors are open switch C connects the "hot line" 104 to line 117 leading to the door-closing solenoid 64, but, as will be explained presently, due to the construction of the control valve V switch C will not be effective to cause the door to close so long as a passenger is on one of the treadles.

Switch D is a normally-closed switch that is held open when the rear doors are closed, but which closes as soon as the rear doors start to open. This serves as a holding switch to set up the step-treadle circuits so that they may continue to energize the door-opening solenoid 63 once the doors have started to open regardless of the conditions affecting the front-door control switch E and the operator-controlled switch G. Switch D connects the "hot line" 104 to the line 118 leading to the step-treadle line 105, as has been explained.

Résumé of operation (Fig. 1)

The front-door motor F in the system under consideration is controlled pneumatically by the valve 14 accessible to the operator, and this is the only means of controlling operation of the front door. Of course, the rear door may be controlled pneumatically by valve 16 as has been described, but in normal operation valve 16 need not be touched by the operator and is left in its closed position. In fact, valve 16 may be considered an emergency valve to be employed only if the electrical system has suffered a casualty, whereupon such system is disconnected from the battery by the switch 102.

With both doors closed, the circuit will be as follows: Operator-controlled push button switch G will be open, switch E will be held by a connection to the door motor F, and switch D will be held open by the cam 122 in switch box S, so that all connections between the "hot line" 104 and line 105 are open. When the bus comes to rest and the operator causes the front door to open (by means of valve 14), the contactor on the door motor is withdrawn from switch E, which, being a normally-closed switch, moves to its closed position. This energizes the step treadles T, but if no passenger is standing thereupon the rear door remains closed. However, should a passenger be standing on either treadle, line 106 leading from the treadles is energized which, by means of line 107, energizes the door-opening solenoid 63, which overcomes the bias spring 62 and causes the rear door to open. Under these conditions, fluid under pressure is conducted to line 28, check valve 24, and line 26 to the rear-door motor R.

As soon as the rear door starts to open, switch B in the switch box is closed by cam 123, energizing the magnet valve W, and hence, actuating the interlock safety circuits. Likewise as soon as the rear doors start to open switch D is closed and holds the treadle T energized, regardless of the condition of the front-door switch E and the push button switch G. In other words, even if the front door were closed by the operator, thereby opening switch E, switch D would hold the treadles energized so that the rear door can be held open under treadle control.

As soon as the rear doors are fully opened, cam 123 (Fig. 9) moves out from under switch C which, being normally closed, energizes line 117, and, hence, the door-closing solenoid 64. However, so long as a man is on the treadle, with the rear door open, switch D remains closed and also energizes the door-opening solenoid 63. Thus, the fact that switch C is closed has no effect upon the system, because even though the two solenoids are opposed, the pneumatic and magnet bias of the valve in unit V are such that door-closing solenoid 64 cannot overcome the bias.

However, as soon as no passengers are on the treadles T the circuit to the door-opening solenoid 63 is broken and door-closing solenoid 64, energized by switch C, takes over and moves the valve to the door-closed position. Should passengers be standing on the treadles T and there be no cause to open the front door so that front-door-controlled switch E remains open, the rear door can be opened by the operator without using the air valve 16, by momentarily pressing switch G, closing the circuit through the treadles, and energizing the door-opening solenoid 63. This is a quicker and simpler control than that wherein the pneumatic valve 16 is employed because with electrical operation the door is automatically closed, whereas if valve 16 is employed it must be turned back to the closed position at the proper time.

With regard to the sensitive edges, these are in a position to energize the door-opening solenoid 63 as soon as the rear door starts to open, thereby shifting switch A to line 106a. Switch A remains in this position until the door is closed, and if at any intermediate closure position an obstruction exists between the sensitive edges they will energize the door-opening solenoid through switch A, as has been explained.

Thus, it can be seen that in normal operation and when employing the accessories, the vehicle cannot be started when the rear door is open, the doors cannot injure the passengers, the doors will automatically open when a passenger is in a position to leave the vehicle, and will thereby automatically close when the passenger alights, all of which is accomplished by a simple hook-up that may be superimposed upon the basic pneumatic system, which hook-up requires no relays.

*Electro-pneumatic system automatic control*

Figure 10:
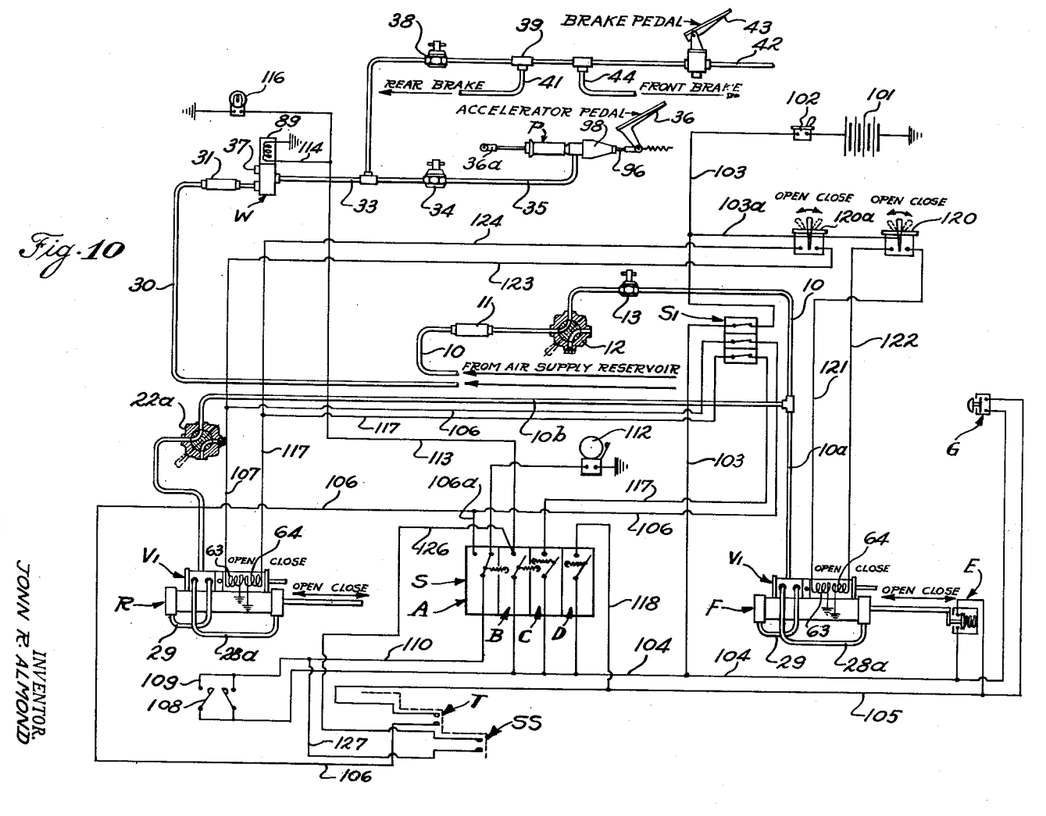
Fig. 10 is a schematic diagram of one form of an electro-pneumatic system arranged for automatic control of the rear door; and, Fig. 11 is a schematic diagram of another form of electro-pneumatic system, arranged for manual control of the rear door.

Fig. 10 is a schematic diagram of a modified system employing many of the units previously described, such units being designated by the same reference characters employed in connection with the diagram of Fig. 1. There is a fundamental difference between the system shown in Fig. 10 and that just described in that Fig. 10 shows a system wherein the pneumatic door motors are controlled entirely by electrical connections instead of providing a pneumatic valve for controlling the front door and an emergency pneumatic valve for controlling the rear door.

In this system master double-solenoid-controlled valve units $V_1$ are fitted to both the front and rear-door motors F and R, such units being like the unit V previously described except that the bias spring 62 for the solenoid valve is omitted in both units. Another difference in the connection of the control valves is that at the rear door no transfer check valve 24 is required. Thus line 28a from the valve now leads directly to the end of the cylinder that causes the rear door to open.

The air supply line 10 in this system serves as a direct source of air under pressure for the solenoid valves $V_1$ and has for this purpose branches 10a and 10b for the front and rear doors respectively, there being a three-way vent cock 22a in the latter line which functions as an emergency valve. Switch box S and its switches A to D are incorporated unchanged in this system as are the switches E and G for initiating opening of the rear door. The brake and accelerator interlocks and their controlling magnet valve and various other units may also be incorporated in the manner previously described.

The basic control for the doors is by means of a switch 120 conveniently disposed to the operator for actuation of the front door and another switch 120a (which need not be readily accessible) for actuation of the rear door. Both switches are of the single-pole, double-throw, normally-open variety. When switch 120 is moved to the front door-open position, line 121 is energized through a branch line 103a leading from the battery 101 to cause solenoid 63 to shift the valve in unit $V_1$ to its open position, thereby directing air through line 28a to cause the front door to open. The front door is closed by manipulating the switch 120 to energize line 122. Switch 120a controls the rear doors in a similar manner, alternately energizing line 123 to open the doors and line 124 to close the doors, except that this switch is only used as an auxiliary or emergency switch.

The sequence of operation of switches A to D, which are connected mechanically to the rear door, is like that previously described. Likewise the operation of the step treadle T is also like that described, namely when the "hot line" 104 is connected to the line 105 either by the closing of switch E due to the opening of the front door or by the closing of switch G manually, step treadle T may complete a circuit to lines 106 and 107 to the rear door-opening solenoid 63, thereby causing the rear door to open automatically. Thus, it can be seen that in the circuits described so far, the system is readily adapted for either pneumatic or electro-pneumatic control by the simple expedient of adding another valve $V_1$ to the front-door-control motor F.

Shown in Fig. 10 is a control feature referred to in the art as a sensitive step SS, which has in some respects the same function as the treadle step T, but is connected differently into the system. A sensitive step is generally, but not necessarily, connected into the lower step treadle, and differs from the step treadle previously described in that closing of the sensitive step-treadle contacts is not enough to cause the rear door to open from its fully-closed position, even if the switches E or G are closed. A sensitive step, on the other hand, acts similarly to the sensitive edges in that once the door is opened, a weight on the sensitive step will prevent it from closing either under the action of the automatic door-closing switch C or due to the momentary positioning of the manual switch 120a to the closed position. Also, once the door is closed, the rear doors cannot be opened from the outside by inserting a tool between the sensitive edges and pressing on the sensitive step.

Switch B, which closes as soon as the rear doors start to open, is included in the sensitive-step circuit to accomplish these results, the circuit being as follows: Switch B is connected to the "hot line" 104 and makes or breaks the circuit to line 113 leading from switch B to the brake and accelerator interlocks. Another line 126 leads from switch B to one set of contacts in the sensitive step SS, the other contacts leading, by means of line 127, to the line 110 that connects the sensitive edges to switch A. If the rear doors are fully closed the switches will be in the position shown in Fig. 10 so that even though the sensitive-step contacts are closed by a passenger standing on the step, these contacts are not energized because the "hot line" 104 leading to switch B is interrupted at the switch. Nor will the signal bell ring because the sensitive steps are not energized. Thus, the sensitive steps are ineffective to cause the rear door to open.

However, should the rear door have been opened to any degree by the action of the operator, or by the automatic action of the step treadle T, and should it start to close as a passenger steps off the treadle T and onto the sensitive step SS, different results are obtained. With the doors open or partly open switch B is closed and line 126 leading to the sensitive steps is energized and the latter, in turn, energize line 127 leading to the sensitive-edge line 110. Line 110 leads to switch A which is in its left-hand position in the drawings when the rear door is partially open, so that line 106a leading to line 106 is energized. Line 106 is the rear door-opening line and leads to line 107 connected to the rear door-opening solenoid 63. Thus, when a passenger steps on the sensitive steps with the doors open even if the doors are closing they will open. This will be understood when it is recalled that switch C (which sets up the door-closing circuit 117) is only closed when the doors are fully opened. Thus, switch C may have moved the valve in unit V to the door-closing position, but once the doors start to close from their fully-open position switch C is opened. Now the sensitive-step circuit is in operation through closed switch B, and since solenoid 64 was de-energized when switch C opened and the valve was only held by the differential air pressure action, the door-opening solenoid 63 may take over and shift the valve to the door-opening position.

Once the passenger leaves the sensitive step its circuit is opened and the door will soon open fully and pass through a position whereby switch C is closed, setting up the door-closing circuit 117 and shifting the valve to the closed position by means of solenoid 64 so that the air-biased valve remains in the door-closed position until the rear door is fully closed.

The three-pole, single-throw switch S₁, shown in Fig. 10, isolates all accessories and the rear-door solenoids when the switch is opened. Of course, it is within the scope of the invention to substitute two sensitive treadles or two sensitive steps for the combination circuit shown in Fig. 10, such connections being obvious to those skilled in the art in view of this disclosure and are not illustrated in detail in the interests of brevity. If two sensitive treadles were connected they would be placed in parallel, as shown in Fig. 1, or if two sensitive steps were connected they would be similarly placed in parallel, their common connections being like that of the sensitive step SS shown in Fig. 10.

*Electro-pneumtaic system, modified form, with manual control*

Figure 11:
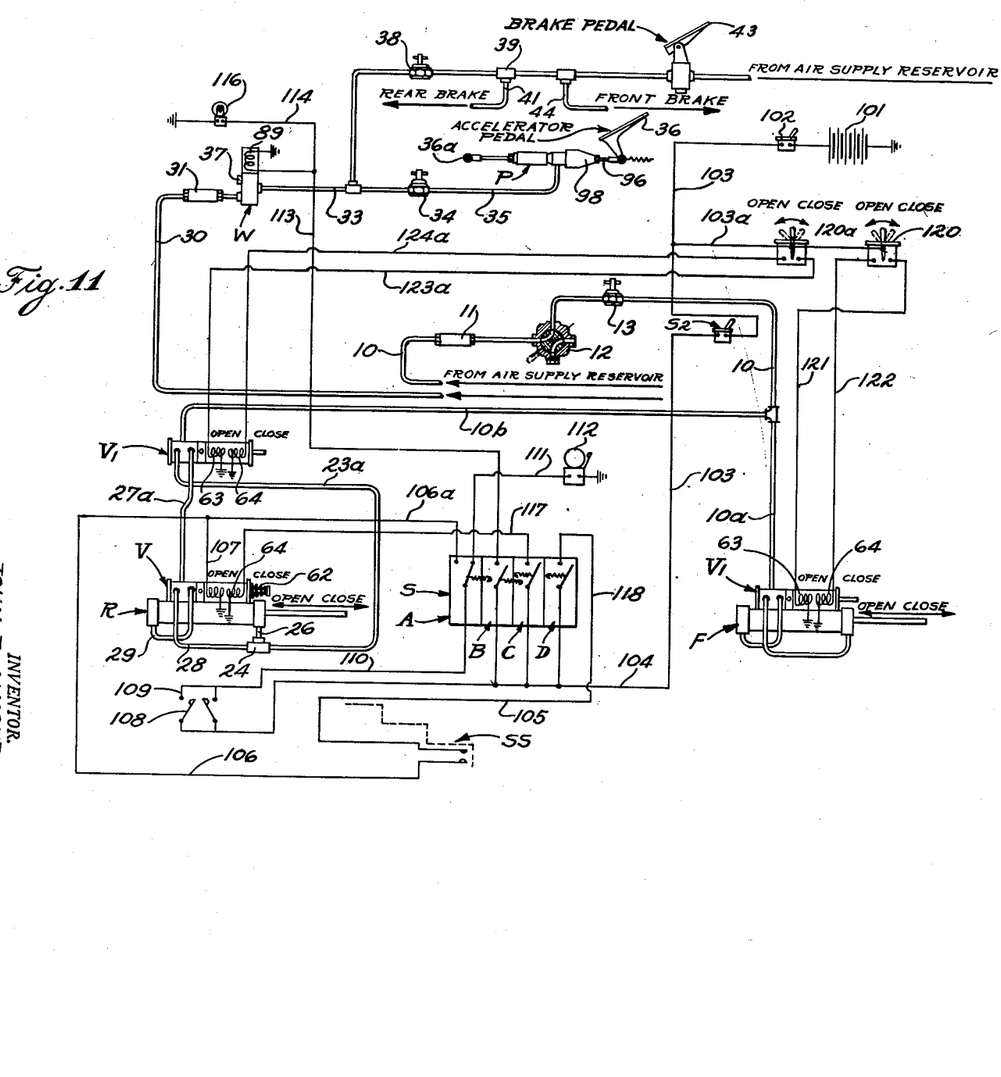

In the system shown in Fig. 11, the elements are arranged for non-automatic control, that is, the operator controls both the front and rear doors manually by manipulation of the switches 120 and 120a. In this system the step-treadle and front-door-controlled switches that result in automatic opening of the rear door when a passenger is on the upper step and the front door is opened are not provided, the rear door being opened and closed in normal operation by manipulation of manual switch 120a by the operator.

However, the sensitive edges 108 and 109 are provided as a safety measure and, in addition, a sensitivee step SS, on the lower step in this instance, is provided to keep the door from closing upon a passenger alighting from the vehicle. Under these circumstances it is necessary that the sensitive edges and the sensitive step be enabled to take over control of the rear door from the switch 120a so that even though such switch be maintained in the door-closed position by the operator, the door will not close when either the sensitive-step contacts or the sensitive-edge contacts are closed. To this end a double-solenoid control valve V₁ is interposed between the air supply line 10b leading from the main air supply line 10 and the spring-biased solenoid valve V adjacent the rear-door motor R.

The electrical connections of the rear-door motor and solenoid are like that described in connection with Fig. 1, but the air connections are different in that instead of leading directly from a manually-controlled air valve, the air connection 27a to the solenoid valve and 23a to the transfer valve 24 at the rear-door motor run from the two outlet ports of the interposed valve in unit V₁. The brake and accelerator interlock connections controlled by switch B are the same as has been described and the operation of the front door is like that described in connection with Fig. 10, being under the direct control of manual switch 120.

In normal operation, the valve V is biased by spring 62 to the door-closed position. When the operator wishes to open the rear doors, switch 120a is moved to the door-open position energizing line 123a which, instead of leading to the main valve V as in Fig. 10, leads to the interposed valve V₁ energizing the door-open solenoid 63 in such valve and moving the valve to the door-open position. Under these conditions air from branch line 10b is directed to the valve in unit V₁, through line 23a leading from the valve to the transfer valve 24, through line 26, and to the door motor R, causing the door to open.

In order to close the door, switch 120a is moved to the closed position energizing line 124a which reverses the valve V₁ directing air therefrom by means of line 27a to the valve unit V on the rear-door motor R. Thus, it can be seen that insofar as the operator's control of the door-closing action is concerned, he is dependent upon the position of valve unit V which, although it is spring-biased to the door-closed position, is, in reality, not under direct control of the operator but is also controlled by the electrical circuits leading to the solenoids 63 and 64 forming part of the safety or accessory systems. However, in normal operation air from line 27a is directed by valve V to line 29, and, hence, to the rear of the motor R to cause the door to close.

Once the door starts to open the safety accessories are activated. Switch A is shifted to the left in the drawings so that when the sensitive-edge contacts 108 and 109 are closed, current is conducted from the "hot line" 104 to lines 106a and 107 to the door-opening solenoid 63 of the valve unit V. This moves the valve to the open position against the bias of spring 62 and the pneumatic bias causing the door to open and clear the obstructions. This action will take place even though the operator holds switch 120a in its closed position because valve V may reverse the flow of air to the motor R independently of the operator's control of the switch.

Similarly, should the door be opened a small amount switch D is closed so that current from the "hot line" 104 connects by line 118 leading from the switch to line 105 leading to the sensitive-step contacts. Thus, even though the door be partaking of a closing motion due to manipulation of switch 102a by the operator, or due to the momentary closing of switch C when the door was fully open, as soon as the passenger steps on the sensitive step the contacts are made, lines 106 and 107 are energized leading to the door-opening solenoid 63 of the valve V, thereby shifting that valve so that air from pipe 27a is directed to line 28, and, hence, to the side of the motor R that causes the door to open. Again this action takes place independently of the operator's holding the switch 120a to the door-closed position. If the air valve V₁ were not present in the installation, and if lines 123a and 124a were connected directly to the valve V if the operator happened to hold the switch 120a in the door-closed position, the magnetic bias, inherent in the solenoid valve, would prevent the door-opening solenoid 63 from taking over, even though the accessories are actuated in order to open the door.

The aforesaid system affords another example of the flexibility inherent in applicant's basic switch and double-solenoid valve arrangement and again the desired safety features are incorporated without the use of relays but by merely installing multiple units of standard construction, either with or without spring bias for the valves V. In the arrangement shown in Fig. 11 the sensitive step is merely a safety measure, and like the sensitive step of the arrangement in Fig. 10 it does not automatically initiate opening of the door.

It will be apparent to those skilled in the art that in some cases the sensitive step may be wired in parallel with the sensitive edges, the change thereby effected being that closing of the sensitive step contacts with the doors closed, will ring the bell 112.

Having completed a detailed description of applicant's invention it will be apparent that other systems may be built up from the basic components disclosed. For example, systems may be arranged with two sensitive steps in parallel or two sensitive treadles in parallel, or combination of sensitive steps and sensitive treadles, all in accordance with the principles that will be apparent from the three typical installations described in detail. Also the presence or absence of the brake and pedal interlocks, or one or the other of them, is a matter of specification of the purchaser, the door-control switch B being always available for properly energizing such interlocks in accordance with the invention. Accordingly, the scope of the invention is determined by the appended claims and not by the aforesaid embodiments thereof which are presented merely so that those skilled in the art may readily practice the invention.

What is claimed is:

1. A door-operating system for vehicles comprising a motor having a double-acting fluid piston and cylinder assembly for opening and closing a door; a control valve having an inlet port, an atmosphere vent port, two pressure outlets connected to opposed ends of said cylinder, the door-opening connection including a transfer check valve, a valve member for alternately connecting said inlet port to said outlets for opening and closing the door, and a pair of opposed electric solenoids connected to said valve member to actuate said member; switch means mechanically actuated by said motor, said switch means comprising first contact means that are open when the door motor is in the closed position and which are closed when the door motor moves to open the door, said switch means including second contact means that are normally open but are closed when the door motor approaches its open position, a source of current, step-treadle contact means, sensitive door edge contact means, and a magnet valve for controlling brake and accelerator safety devices; said step-treadle and door-edge contact means each being in a series circuit that includes said current source, said first contact means and said door-opening solenoid; said magnet valve being in a series circuit that includes said current source and said first contact means; said current source, said second contact means, and said door-closing solenoid also being connected in series; and means arranged for control by the vehicle operator comprising a two-way manual valve, a source of fluid under pressure for said valve, and connections from said manual valve to the inlet port of said control valve and to said transfer valve.

2. A door-operating system for vehicles comprising a motor having a double-acting fluid piston and cylinder assembly for opening and closing a door; a control valve having an inlet port for connection to a source of fluid under pressure, an atmosphere vent port, two pressure outlets connected to oposed ends of said cylinder, the door-opening connection including a transfer check valve, a valve member for alternately connecting said inlet port to said outlets for opening and closing the door, and a pair of opposed electric solenoids connected to said valve member to actuate said member; switch means mechanically actuated by said motor, said switch means comprising first contact means that are open when the door motor is in the closed position and which are closed when the door motor moves to open the door, said switch means including second contact means that are normally open but are closed when the door motor approaches its open position, a source of current, step-treadle contact means, sensitive door-edge contact means, and a magnet valve for controlling brake and accelerator safety devices; said step-treadle and door-edge contact means each being in a series circuit that includes said current source, said first contact means and said door-opening solenoid; said magnet valve being in a series circuit that includes said current source and said first contact means; said current source, said second contact means, and said door-closing solenoid also being connected in series; and means arranged for control by the vehicle operator for moving said valve member, comprising a two-way manual switch, a source of current for said switch, and connections from said switch to said door-opening and closing solenoids.

3. A door-operating system for vehicles comprising a motor having a double-acting fluid piston and cylinder assembly for opening and closing a door; a control valve having an inlet port for connection to a source of fluid under pressure, an atmosphere vent port, two pressure outlets connected to opposed ends of said cylinder, the door-opening connection including a transfer check valve, a valve member for alternately connecting said inlet port to said outlets for opening and closing the door, and a pair of opposed electric solenoids connected to said valve member to actuate said member; switch means mechanically actuated by said motor, said switch means comprising first contact means that are open when the door motor is in the closed position and which are closed when the door motor moves to open the door, said switch means including second contact means that are normally open but are closed when the door motor approaches its open position, a source of current, step-treadle contact means, sensitive door-edge contact means; said step-treadle and door-edge contact means each being in a series circuit that includes said current source, said first contact means and said door-opening solenoid; said current source, said second contact means, and said door-closing solenoid also being connected in series; and means arranged for control by the vehicle operator for moving said valve member, comprising a two-way manual switch, a source of current for said switch, and connections from said switch to said door-opening and closing solenoids.

4. A door-operating system for vehicles comprising a motor having a double-acting fluid piston and cylinder assembly for opening and closing a door; first and second control valves each having an inlet port, an atmosphere vent port, two pressure outlets, a valve member for alternately connecting said inlet port to said outlets, and a pair of opposed electric solenoids connected to said valve member to actuate said member; one outlet of said first control valve being connected to the door-closing end of said cylinder and the other outlet being connected to the door-opening end of said cylinder through a transfer check valve; one outlet of said second control valve being connected to the inlet of the first control valve, the other outlet being connected to said transfer valve and the inlet to a source of fluid under pressure, switch means mechanically actuated by said motor, said switch means comprising first contact means that are open when the door motor is in the closed position end which are closed when the door motor moves to open the door, said switch means including second contact means that are normally open but are closed when the door motor approaches its open position, a source of current, step-treadle contact means, sensitive door-edge contact means, said step-treadle and door-edge contact means each being in a series circuit that includes said current source, said first contact means and the door-opening solenoid of said first control valve; said current source said second contact means, and the door-closing solenoid of said first control valve also being connected in series; and means arranged for control by the vehicle operator for moving the valve member of said second control valve to a door-opening and door-closing position, said means comprising a source of current, connections to the solenoids of said second control valve, and switch means for selectively energizing either solenoid connection; the solenoids of said first control valve being arranged so that when the door-opening solenoid is energized energization of the other solenoid will not shift the valve member.

5. A door-operating system for vehicles comprising a double-acting fluid motor, a reversing valve connected to said motor and to a source of fluid under pressure, a source of current, opposed solenoids connected to said valve for moving the latter to the door-opening and closing positions, opposed pressure contacts at the door and arranged to be closed by a passenger, a mechanically-actuated switch connected to and actuated by said motor and having a pair of contacts that are open when the door is closed and closed when the door is partially open, said pair of contacts and said pressure contacts being connected in series between said current source and the door-opening solenoid, and switch means for connecting said door-closing solenoid to said current source.

6. A door-operating system for vehicles comprising a double-acting fluid motor, a reversing valve connected to said motor and to a source of fluid under pressure, a source of current, opposed solenoids connected to said valve for moving the latter to the door-opening and closing positions, opposed pressure contacts at the door and arranged to be closed by a passenger, a mechanically-actuated switch connected to and actuated by said motor and having a pair of contacts that are open when the door is closed and closed when the door is partially open, said switch and pressure contacts being connected in series between said current source and the door-opening solenoid, and switch means for connecting said door-closing solenoid to said current source, said solenoids being arranged so that when the door-opening solenoid is energized energization of the door-closing solenoid cannot overcome the force of the opening solenoid.

7. A door-operating system for vehicles comprising a double-acting fluid motor, a reversing valve connected to said motor and to a source of fluid under pressure, a source of current, opposed solenoids connected to said valve for moving the latter to the door-opening and closing positions, opposed pressure contacts at the door and arranged to be closed by a passenger, a mechanically-actuated switch connected to and actuated by said motor and having a pair of contacts that are open when the door is closed and closed when the door is partially open, said switch and pressure contacts being connected in series with said current source and the door-opening solenoid, said mechanically-actuated switch including a second pair of contacts that are closed when the door is opened and arranged for connecting said door-closing solenoid to said current source.

8. A door-operating system for vehicles comprising double-acting fluid motors for front and rear doors, a reversing valve connected to the rear-door motor and to a source of fluid under pressure, a source of current, opposed solenoids connected to said valve for moving the latter to the door-opening and closing positions, opposed pressure contacts at the door and arranged to be closed by a passenger, a mechanically-actuated switch connected to and actuated by said rear-door motor and having a pair of contacts that are open when the door is closed and closed when the door is partially open, said pair of contacts and said pressure contacts being connected in series with said current source and the door-opening solenoid, said mechanically-actuated switch including a second pair of contacts that are closed when the door is fully opened and are connected in series with said door-closing solenoid and said current source, a switch connected in parallel with said first pair of contacts and arranged to be opened by said front-door motor when the front door is closed.

9. A door-operating system for vehicles comprising a double-acting fluid motor for opening and closing a door; a control valve having an inlet port for connection to a source of fluid under pressure, an atmosphere vent port, two pressure outlets connected to said motor, a valve member for alternately connecting said inlet port to said outlets for opening and closing the door, and a pair of opposed electric solenoids connected to said valve member to actuate said member; switch means mechanically actuated by said motor, said switch means comprising first contact means including three switches that are open when the door motor is in the close position and which are closed when the door motor moves to open the door, said switch means including second contact means that are normally open but are closed when the door motor approaches open position, source of current, step treadle contact means, sensitive door-edge contact means, and a magnet valve for controlling brake and accelerator safety devices; said step treadle and door-edge contact means each being in a series circuit that includes said current source, one switch of said first contact means and said door opening solenoid; said magnet valve being in a series circuit that includes said current source and the third switch of said first contact means; said current source, said second contact means, and said door closing solenoid also being connected in series.

10. A door operating system comprising a double acting fluid motor for opening and closing a door, a valve having a movable valve member controlling the application of fluid under pressure to said motor, solenoids positioned relative to said valve member for moving the latter in opposite directions to actuate the motor to open and to close the door, and an electrical circuit including a source of power and having a branch including in series a passenger actuated switch, a second switch actuated by the opening of the door and the solenoid for actuating the motor to open the door.

11. A door operating system comprising a double acting fluid motor for opening and closing a door, a valve having a movable valve member controlling the application of fluid under pressure to said motor, solenoids positioned relative to said valve member for moving the latter in opposite directions to actuate the motor to open and to close the door, and an electrical circuit including a source of power and having a switch actuated by the opening of the door and the solenoid for actuating the motor to close the door.

12. A door operating system comprising a double acting fluid motor for opening and closing a door, a valve having a movable valve member controlling the application of fluid under pressure to said motor, solenoids positioned relative to said valve member for moving the latter in opposite directions to actuate the motor to open and to close the door and an electrical circuit including a source of power, said circuit having a first branch including in series an operator controlled switch, a first passenger-actuated switch and the solenoid for actuating the motor to open the door, a second branch including in series a first switch actuated by the opening of the door and the solenoid for actuating the motor to close the door, and a third branch including in series a second passenger-actuated switch, a second switch actuated by the opening of the door and the solenoid for actuating the motor to open the door.

13. A door operating system comprising a double acting fluid motor for opening and closing a door, a valve having a movable valve member controlling the application of fluid under pressure to said motor, solenoids positioned relative to said valve member for moving the latter in opposite directions to actuate the motor to open and close the door, and an electrical circuit including a source of power, said circuit having a first branch including in series an operator controlled switch, a first passenger-actuated switch and the solenoid for actuating the motor to open the door, and a second branch including in series a first switch actuated by the opening of the door and the solenoid for actuating the motor to close the door.

14. A door operating system comprising a double acting fluid motor for opening and closing a door, a valve having a movable valve member controlling the application of fluid under pressure to said motor, solenoids positioned relative to said valve member for moving the latter in opposite directions to actuate the motor to open and close the door, and an electrical circuit including a source of power, said circuit having a first branch including in series an operator controlled switch, a first passenger-actuated switch and the solenoid for actuating the motor to open the door, and another branch including in series a second passenger actuated switch, a switch actuated by the opening of the door and the solenoid for actuating the motor to open the door.

15. A door operating system comprising a double acting fluid motor for opening and closing a door, a valve having a movable valve member controlling the application of fluid under pressure to said motor, solenoids positioned relative to said valve member for moving the latter in opposite directions to actuate the motor to open and close the door, and an electrical circuit including a source of power, said circuit having a branch including in series a switch actuated by the opening of the door and the solenoid for actuating the motor to close the door, and another branch including in series a passenger-actuated switch, a second switch actuated by the opening of the door and the solenoid for actuating the motor to open the door.

16. In a vehicle door operating system comprising a double acting fluid motor for opening and closing a door and including a valve having a movable valve member controlling the application of fluid under pressure to said motor, the combination of solenoids operatively associated with said valve member for moving the latter in opposite directions to actuate the motor to open and to close the door and arranged to act as holding coils so long as current is maintained therein, an electrical circuit connected to said solenoids and arranged for connection to a source of power, a door operated switch and a passenger operated switch in series in said circuit and cooperatively arranged with respect to said solenoids to preset conditions in said electrical circuit responsive to door position.

17. In a vehicle door operating system comprising a double acting fluid motor for opening and closing a door and including a valve having a movable valve member controlling the application of fluid under pressure to said motor, the combination of solenoids operatively associated with said valve member for moving the latter in opposite directions to actuate the motor to open and to close the door and arranged to act as holding coils so long as current is maintained therein, an electrical circuit connected to said solenoids and arranged for connection to a source of power, said circuit including a passenger operated switch and a door operated switch means, said door operated switch being cooperatively arranged with respect to said solenoids and said passenger switch to preset conditions in said electrical circuit to maintain said door open so long as said passenger switch is actuated.

References Cited in the file of this patent

UNITED STATES PATENTS

| Number | Name | Date |
|---|---|---|
| 612,324 | Frazier et al. | Oct. 11, 1898 |
| 647,671 | De Lew | Apr. 17, 1900 |
| 1,574,197 | Hynes | Feb. 23, 1926 |
| 1,628,350 | Bailey | May 10, 1927 |
| 1,784,310 | Pardee | Dec. 9, 1930 |
| 1,890,809 | Forman | Dec. 13, 1932 |
| 1,906,699 | Mallison et al. | May 2, 1933 |
| 2,096,043 | Johnson et al. | Oct. 19, 1937 |
| 2,188,704 | Claytor | Jan. 30, 1940 |
| 2,189,221 | Paine et al. | Feb. 6, 1940 |
| 2,206,957 | Hose | July 9, 1940 |
| 2,226,425 | Epperson | Dec. 24, 1940 |
| 2,515,029 | Almond et al. | July 11, 1950 |
| 2,533,423 | Bunch | Dec. 12, 1950 |